(12) United States Patent
Stein et al.

(10) Patent No.: US 6,915,417 B2
(45) Date of Patent: *Jul. 5, 2005

(54) QUICK STARTING EXTERNAL PROGRAMMER FOR IMPLANTABLE MEDICAL DEVICE

(75) Inventors: Richard E. Stein, Edina, MN (US); Eugene Khenson, San Jose, CA (US); Scott Mazar, Inver Grove Heights, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/673,766

(22) Filed: Sep. 29, 2003

(65) Prior Publication Data

US 2004/0068646 A1 Apr. 8, 2004

Related U.S. Application Data

(63) Continuation of application No. 09/474,842, filed on Dec. 30, 1999, now Pat. No. 6,636,963.

(51) Int. Cl.$^7$ ............................................. G06F 15/177
(52) U.S. Cl. .................................. 713/1; 713/2; 714/15
(58) Field of Search ........................... 713/1, 2; 714/6, 714/15; 607/9, 19, 20

(56) References Cited

U.S. PATENT DOCUMENTS

| | | | |
|---|---|---|---|
| 4,430,704 A | 2/1984 | Page et al. ................... | 364/200 |
| 4,663,707 A | 5/1987 | Dawson ....................... | 364/200 |
| 4,691,282 A | 9/1987 | Kinashita ..................... | 364/200 |
| 4,709,349 A | 11/1987 | Hashimoto et al. ......... | 364/900 |
| 4,720,812 A | 1/1988 | Kao et al. .................... | 364/900 |
| 4,959,774 A | 9/1990 | Davis .......................... | 364/200 |
| 5,155,833 A | 10/1992 | Cullison et al. ............. | 395/425 |
| 5,269,022 A | 12/1993 | Shinjo et al. ................ | 395/700 |
| 5,339,426 A | 8/1994 | Aoshima ..................... | 395/700 |
| 5,355,490 A | 10/1994 | Kou ............................. | 395/700 |
| 5,404,546 A | 4/1995 | Stewart ....................... | 395/750 |

(Continued)

FOREIGN PATENT DOCUMENTS

| | | | |
|---|---|---|---|
| EP | 0845742 | 6/1998 | ........... G06F/9/445 |
| JP | 411328137 A | 11/1999 | |

OTHER PUBLICATIONS

*Advanced Configuration and Power Interface Specification, Revision 1.0b,* Intel Microsoft Toshiba,(Feb. 2, 1999), pp. 1–397.

IBM TDB, "Automatic Data Compression Control for Hibernation", vol. 39 No. 4, (Apr. 1996), pp. 185–186.

IBM TDB, "Hibernating and Resuming using a Compressed Memory Image", vol. 38 No. 8, (Aug. 1995), p. 73.

IBM TDB, "Operating System and Machine Independent Hibernation", vol. 38 No. 5, (May 1995), pp. 143–144.

*Primary Examiner*—Chun Cao
(74) *Attorney, Agent, or Firm*—Schwegman, Lundberg, Woessner & Kluth, P.A.

(57) ABSTRACT

A system and method for restoring a microprocessor-based system to a previously booted target state in which an image of memory and the processor registers in the previously booted state is saved and stored in a storage device. A restore routine executing in ROM retrieves the image from the storage device and restores the system memory and processor registers to the target state. An operating system return routine then returns control of the system to the operating system software. In an exemplary implementation, a system in accordance with the invention is incorporated into a microprocessor-based external programmer for a cardiac rhythm management device in order to allow quick starting of the programmer from a powered down condition without going through a time consuming boot process.

20 Claims, 2 Drawing Sheets

U.S. PATENT DOCUMENTS

| | | | |
|---|---|---|---|
| 5,410,711 A | 4/1995 | Stewart | 395/750 |
| 5,519,869 A | 5/1996 | Payne et al. | 395/700 |
| 5,524,249 A | 6/1996 | Suboh | 395/750 |
| 5,530,673 A | 6/1996 | Tobita et al. | 365/185.09 |
| 5,548,765 A | 8/1996 | Tsunoda et al. | 395/750 |
| 5,578,064 A * | 11/1996 | Prutchi | 607/19 |
| 5,590,340 A | 12/1996 | Mortia et al. | 395/750 |
| 5,615,376 A | 3/1997 | Ranganathan | 395/750 |
| 5,619,707 A | 4/1997 | Suboh | 395/750 |
| 5,638,541 A | 6/1997 | Sadashivaiah | 395/750 |
| 5,640,574 A | 6/1997 | Kawashima | 395/750 |
| 5,710,930 A | 1/1998 | Laney et al. | 395/750 |
| 5,862,083 A | 1/1999 | Tobita et al. | 365/185.09 |
| 5,925,129 A | 7/1999 | Combs et al. | 713/300 |
| 5,963,219 A | 10/1999 | Choi | 345/501 |
| 5,968,173 A | 10/1999 | Watts, Jr. | 713/2 |
| 5,978,922 A | 11/1999 | Arai et al. | 713/323 |
| 6,026,486 A | 2/2000 | Kodama et al. | 712/229 |
| 6,029,086 A * | 2/2000 | Kim et al. | 607/9 |
| 6,098,158 A | 8/2000 | Lay et al. | 711/162 |
| 6,101,601 A | 8/2000 | Matthews et al. | 713/2 |
| 6,173,417 B1 | 1/2001 | Merrill | 714/15 |
| 6,209,088 B1 | 3/2001 | Reneris | 713/1 |
| 6,243,831 B1 | 6/2001 | Mustafa et al. | 714/24 |
| 6,273,856 B1 * | 8/2001 | Sun et al. | 600/300 |
| 6,275,727 B1 * | 8/2001 | Hopper et al. | 600/513 |
| 6,280,389 B1 * | 8/2001 | Ding et al. | 600/485 |
| 6,336,174 B1 | 1/2002 | Li et al. | 711/162 |
| 6,385,721 B1 | 5/2002 | Puckette | 713/2 |
| 6,393,560 B1 | 5/2002 | Merrill et al. | 713/2 |
| 6,408,397 B1 | 6/2002 | Alexander et al. | 713/34 D |
| 6,411,850 B1 * | 6/2002 | Kay et al. | 607/20 |
| 6,418,343 B1 * | 7/2002 | Zhang et al. | 607/9 |
| 6,421,777 B1 | 7/2002 | Pierre-Louis et al. | 713/2 |
| 6,505,071 B1 * | 1/2003 | Zhu et al. | 607/28 |
| 6,636,963 B1 * | 10/2003 | Stein et al. | 713/1 |

* cited by examiner

QUICK STARTING EXTERNAL PROGRAMMER FOR IMPLANTABLE MEDICAL DEVICE

CROSS-REFERENCE TO RELATED APPLICATION(S)

This application is a continuation of U.S. patent application Ser. No. 09/474,842, filed on Dec. 30, 1999, now issued as U.S. Pat. No. 6,636,963, the specification of which is incorporated herein by reference.

FIELD OF THE INVENTION

This invention relates to systems and methods for operating computers and other types of microprocessor-based systems. In particular, the invention relates to a system and method for quickly starting up a microprocessor-based system such as an external programmer used gather data from and program a cardiac rhythm management device.

BACKGROUND

In order for a computer or other microprocessor-based system to be in an operational state capable of executing multiple application programs (i.e., those programs that give the system specific functionality), the system must be under the supervisory control of operating system (OS) software. This operational state involves particular code and data being stored in memory that enable the OS to maintain supervisory control over how the system resources are allocated to the various application processes. The usual means by which the operational state is attained is through a boot sequence, in which the processor (CPU) first begins executing (e.g., upon powering up from a powered down condition) at a specific location in a non-volatile read-only memory (ROM). That is, the program counter of the CPU (or instruction pointer in Intel x86 architectures) is initially loaded with the starting address of software in the ROM, usually referred to as the BIOS (basic input/output system) because of other functions performed by the software. The BIOS code contained in the ROM defines the basic steps taken by the system when it starts, including hardware detection and initialization and loading of the operating system by a bootstrap loader. Execution of the bootstrap loader causes the boot record of the storage medium containing the operating system software (e.g., a hard disk, floppy, or CD-ROM) to be read into system memory, which is usually volatile dynamic random access memory (DRAM). The boot record contains a boot program which is then executed to begin the process of loading the operating system into memory from the storage medium.

The process of booting the system is time-consuming because the operating system must perform certain computations in order to configure itself to the particular system, including hardware detection/initialization and the building of various data structures to be used in the management of system resources such as memory and processor time. In certain situations, it would be advantageous for a system to be able to transition quickly to a booted operational state without going through a lengthy boot process. It is toward that general objective that the present invention is primarily directed.

SUMMARY OF THE INVENTION

The present invention is a system and method for enabling a computer or other microprocessor-based system to transition to a target state without going through a boot process. The target state is a booted operational state in which the operating system is in control of system resources, and application programs are either loaded in memory or available for loading from a storage medium by the operating system. In accordance with the invention, an image of the target state is captured and saved in a nonvolatile image storage medium. The image of the target state includes the contents of volatile DRAM memory and the values stored in processor registers when the system is in the target state. In one embodiment, a restore routine contained in a nonvolatile memory is executed upon power-up of the system. The restore routine then extracts the target state image from the image storage medium and begins the process of restoring the target state. After the system memory and registers are loaded with values corresponding to the target state, processor execution is transferred to an operating system return routine that returns control of the system to the operating system software.

In accordance with the invention, the target state image contained in the image storage medium includes a memory image and a target state data structure. The target state data structure contains values to be stored in the processor's registers and information enabling the restore routine to properly store the memory image into system memory. In one embodiment the memory image is formed by directly copying contents of the system volatile memory. The copied contents are then stored in the image storage medium, with or without data compression. The memory image can then be copied directly from the image storage medium into appropriate memory locations by the restore routine. In another embodiment, the target state image is generated by an image saving routine that uses the paging scheme implemented by the operating system to create a memory image made up of page frames, i.e., corresponding only to memory locations actually used by the system in the target state. Information from the page tables maintained by the operating system are then copied to the target state data structure for enabling restoration of the page frames in memory by the restore routine.

DETAILED DESCRIPTION OF THE INVENTION

Figure 1:
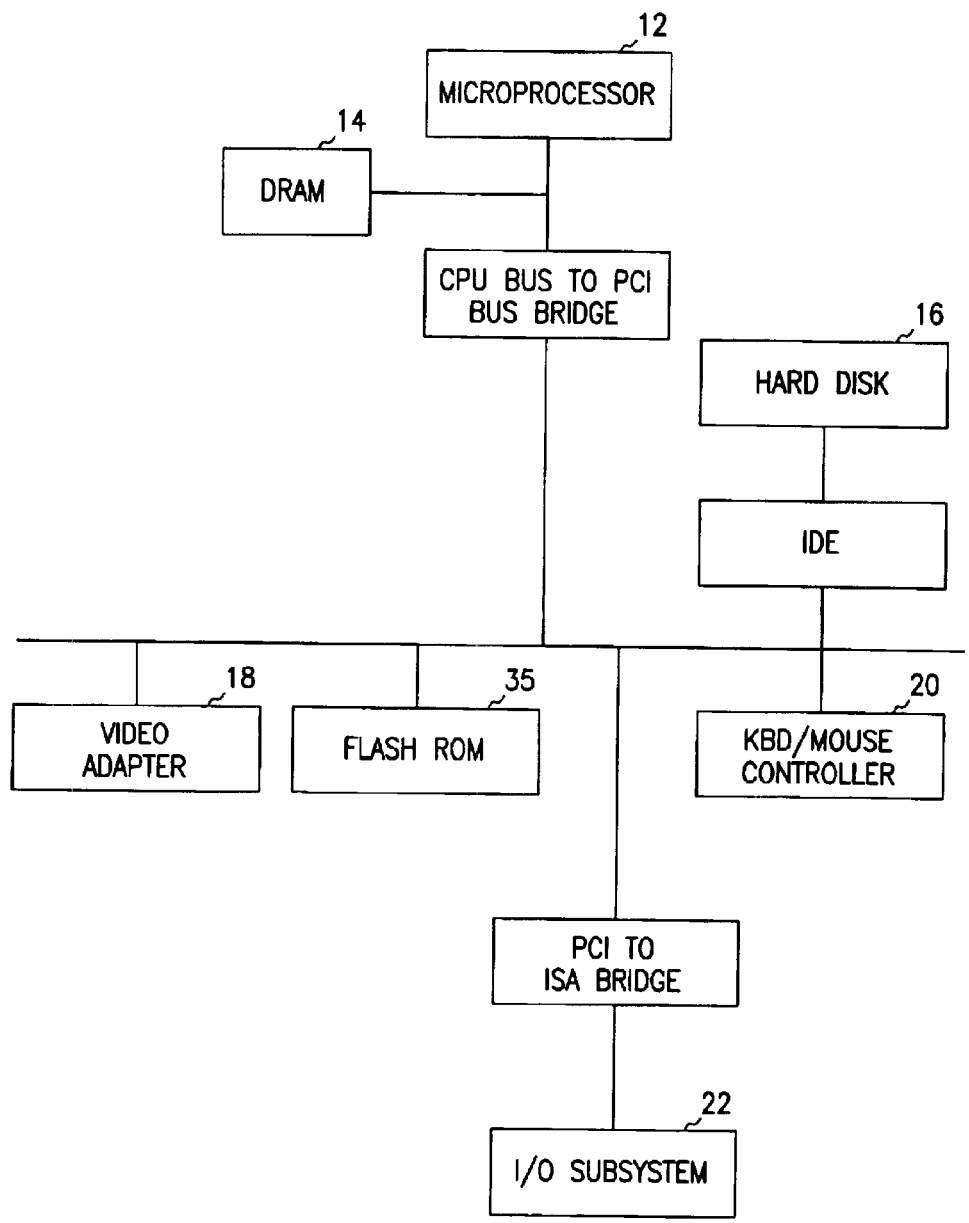
FIG. 1 is a system diagram of a microprocessor-based system suitable for incorporating a system in accordance with the invention.

The present invention may be embodied as a system for transitioning a microprocessor-based system to a target state booted with operating system software. The system employs a restore routine to restore the system's volatile memory and processor registers to correspond to the target state. An image storage medium contains an image of the target state made up of a memory image and a target state data structure. The image storage medium is a nonvolatile memory or storage device such as an electrically erasable programmable read-only memory (EEPROM, a.k.a. flash ROM), a hard disk, floppy disk, ferro-electric memory, battery-backed RAM, or an optical storage medium. The restore routine is contained in a non-volatile memory such as a flash ROM or battery-backed RAM, but may relocate itself during execution to an area of volatile memory known to be unused in the target state. The restore routine would typically be contained in the same medium as the system BIOS and execute in lieu of the BIOS's boot program. The image storage medium may be a flash ROM or other non-volatile medium with sufficient storage capacity such as a hard disk. The restore routine includes code for retrieving the memory image and the target state data structure from the image storage medium. After restoration of volatile memory and processor registers to correspond to the target state, processor execution is transferred to an operating system return routine by loading the processor's instruction pointer with the routine's address. The operating system return routine then returns control of the system to the operating system software after making any further needed adjustments.

A target state image saving routine executed by the operating system may be used to generate and save the target state image. In one embodiment, a copy of the contents of all of volatile memory in the target state is stored as part of the target state image. In order to reduce to size of the target state image, data compression techniques can be applied to the memory contents before storing. In another embodiment of the invention, rather than storing the entire contents of volatile memory, only the contents of locations in volatile memory that are actually in use by the system in the target state are saved as a memory image. The size of the memory image that must be stored in order to restore the target state is thus decreased. (Further decreases can be obtained by using data compression techniques to compress the memory image.) In order to accomplish this, the image saving routing uses the paging scheme of the operating system in order to identify used memory locations in a target state. Paging is a technique in which the operating system allocates units of memory called pages in a linear address space and maps those pages to page frames in physical address space (i.e., to physical locations in memory). The linear address space may be larger than the physical address space with unmapped pages kept on a storage medium such as a hard disk and copied into memory as needed, thus providing one way of implementing a virtual memory. Page tables maintained by the operating system and the paging mechanism of the processor provide the page to page frame mapping function. The memory image corresponds to pages in linear address space that are mapped into page frames of physical address space by the paging scheme of the operating system in the target state. It thus represents only the contents of those memory locations that are actually in use in the target state. The target state data structure contains information derived from the operating system's page tables that relates the stored memory image to physical addresses. The restore routine retrieves the target state data structure from a known location in the image storage medium. Code in the restore routine then copies the memory image to volatile memory in a manner that restores the page frames of the target state. The target state data structure also contains the contents of the processor's registers in the target state so that the registers can be reloaded with the values by the restore routine.

As aforesaid, a target state image saving routine is executed in order to take a snapshot of the target state. A target state process may first be executed in order to move the system to the desired target state before the image saving routine is called. In order to isolate the system resources and allow unlimited access to memory while an image of the system is captured, the image saving routine is implemented as an interrupt servicing routine which executes at the kernel privilege level and with interrupts disabled. So that no changes will be made to the hard disk files during the image capturing process, the disk file system is unmounted by the image saving routine. After the image is saved in the image storage medium, execution jumps to the operating system return routine which remounts the file system, re-enables interrupts, and executes an interrupt return to the target state process in order to relinquish control back to the operating system. This is the same operating system return routine jumped to by the restore routine in the final stages of restoring the target state. The operating system return routine is thus contained in the page frames of the target state.

In capturing the target state image, the image saving routine scans the presently used paging directory and paging tables and generates a copy of the page directory filled with linear addresses of paging tables. This structure enables translation of linear addresses to physical addresses. The image saving routine further generates a list of physical addresses of page frames stored in volatile memory locations from the contents of page tables. A list of linear addresses of pages that are mapped to page frames in memory in the target state is also created to enable translation of physical addresses to linear addresses by indexing into the list with a physical address. The target state image saving routine uses the list of linear addresses of mapped pages and the list of physical addresses of page frames to create the memory image for storing in the image storage medium.

In the case where the image storage medium is flash ROM, the image saving routine must use the paging scheme to access it. Accordingly, code is provided in the target state image saving routine for: (a) obtaining a physical address of the image storage medium from a hardware configuration file, (b) patching a blank entry of the page directory with the physical address of a page table created to contain the physical addresses of the image storage medium, (c) accessing the storage device with a linear address corresponding to the patched entry in the page directory and the page table pointed to thereby, and (d) storing the memory image and target state data structure in the image storage medium. If the image storage medium is a hard disk, on the other hand, the file system is unmounted and interrupts disabled during the image capture process for the reasons stated above. Therefore, code is provided in the target state image saving routine for: (a) accessing the hard disk without interrupts, (b) interpreting a partition table of the hard disk to find a designated storage file and calculate a linear block address thereof, and (c) storing the target state data structure and memory image in the designated storage file.

Since there is no operating system present before the target state is reached, the retrieval and storing of the memory image by the restore routine is performed using physical addresses with paging switched off. The target state data structure includes a list of physical addresses that corresponds to volatile memory locations in which page frames are stored in the target state. The list is then employed by the restore routine to store the memory image retrieved from the storage device into volatile memory at selected locations. The restore routine then switches on paging before transfer to the operating system return routine. The target state data structure contains the physical address of the page directory in the target state, and the restore routine then includes code for: (a) patching the page directory so that physical addresses of restore routine instructions are mapped to the same physical addresses, (b) saving information for unpatching the page directory in the target state data structure, and (c) enabling paging before jumping to the operating system return routine. The target state data structure contains the physical address corresponding to the memory location of the target state data structure in the target state, enabling the restore routine to write to the target state data structure. Code in the operating system return routine then invalidates translation lookaside buffers of the paging mechanism, and unpatches the page directory with information contained in the target state data structure.

The following is a description of an exemplary implementation in which a system in accordance with the invention is incorporated into an external programmer for a cardiac rhythm management device (e.g., a pacemaker). The programmer is thus provided with the capability of quick starting from a powered down condition without going through a lengthy boot process, thus saving time for the clinician and patient when the pacemaker is monitored and/or programmed either at the time of implant or during follow-up. The implementation as described has been shown to be capable of transitioning from a powered down to an operational state in less than twenty seconds, a result that has heretofore not been achieved by any currently available external programmer using a 16-bit or greater microprocessor.

As illustrated in FIG. 1, the programmer in this example is a microprocessor-based system 10 that includes a Pentium processor 12, a DRAM memory 14, a hard disk drive 16 with integrated controller, a video adapter 18 for driving a display, a keyboard/mouse controller 20, and a non-volatile flash ROM memory 35. The components connect to the system over a system bus 30 or a PCI bus 40. Also interfaced to the system over an ISA bus is an I/O subsystem 22 that includes telemetry and EKG circuits, each with a processor, memory, and I/O interface circuitry. The flash ROM 20 contains the BIOS (basic input/output system) and a restore routine that restores the DRAM memory and processor registers to a target state upon powering up the unit. When configured to do so, the BIOS startup routine transfers control to the restore routine after completing the normal hardware detection and initialization tasks, rather than booting the operating system software from the hard drive. The target state image, which includes a memory image and a target state data structure, is stored in either the hard drive or the flash ROM and is extracted by the restore routine for loading into memory and the processor registers in order to move the system to the target state. The I/O subsystem 22 also has flash ROM memories for the EKG and telemetry circuits which may contain restore routines to facilitate quicker booting of those systems. The telemetry and EKG circuits also contain DSPs (digital signal processors) that have flash memory for their boot up as well as for filtering, control and functional algorithms. Using flash ROM memories as target state image storage media for both the main system 10 and I/O subsystem 22 provides a quicker startup than a hard disk drive, as the flash memory is initialized immediately after power is established, whereas the hard drive takes 3 to 5 seconds to initialize due to the motor spin up time. Access times are also faster with flash ROM memory.

In this exemplary implementation, the operating system (OS) software used is the QNX operating system along with the QNX Windows graphical user interface. QNX is a real-time OS that provides memory management and resource allocation for application programs running under it that provide specific functionality to the programmer (e.g., telemetry and EKG processing). The target state image may include only QNX, with all application processes being loaded from the hard drive, or may additionally include one or more application processes that are started immediately upon attaining the target state. Additional application processes may then loaded from the hard drive by the OS as they are needed in the normal manner.

Figure 2:
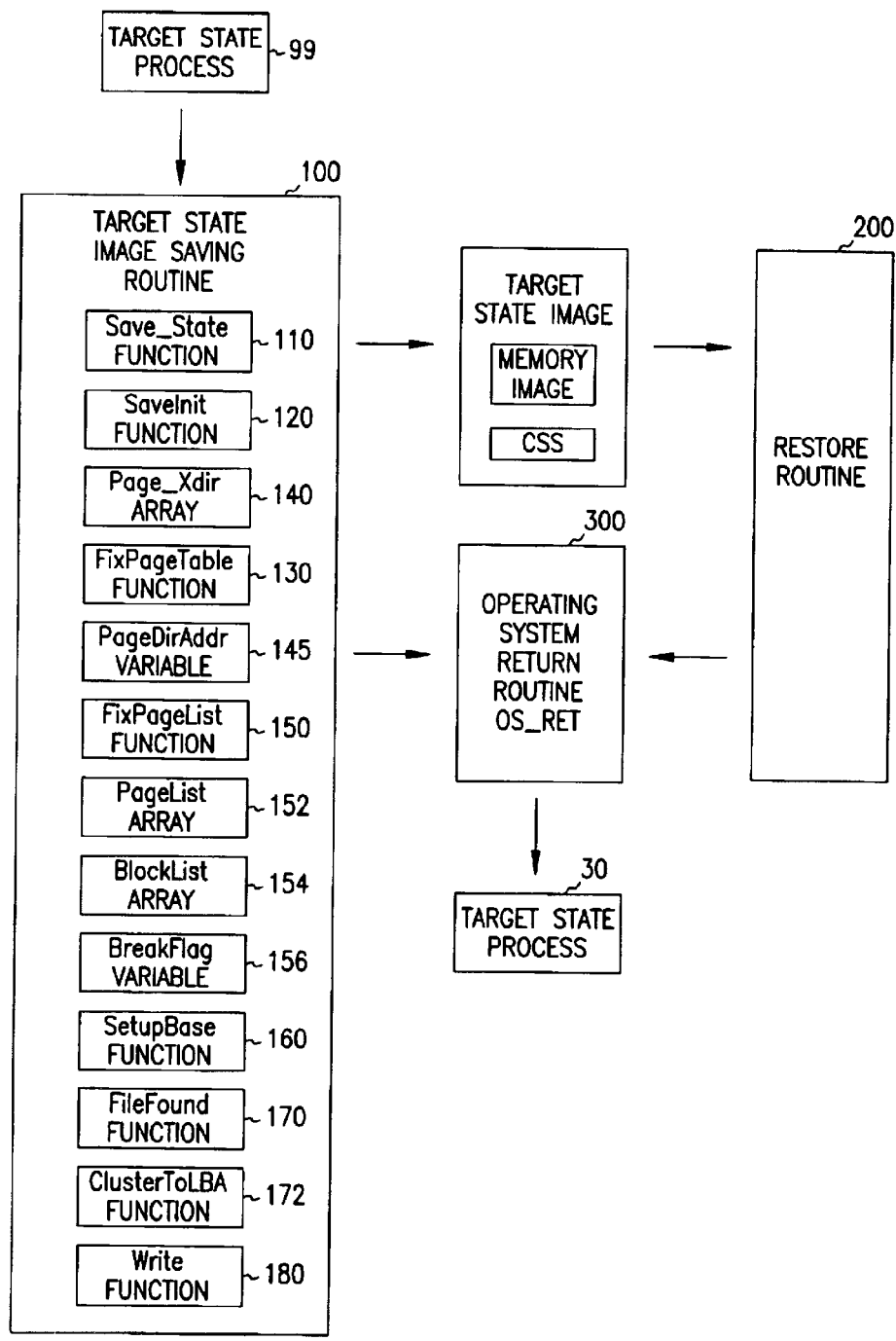
FIG. 2 is a block diagram of the software components for a particular implementation of the invention.

As described above, the quick starting system that is incorporated into the programmer is made up of three main software components as shown in FIG. 2: a restore routine 200, a target state image saving routine 100, and an operating system return routine 300. The restore routine includes all of the code and data structures used in restoring the system to the target state and is located in the BIOS address space (i.e., in the ROM or flash ROM containing the BIOS). It is executed in place of the BIOS's boot program after the BIOS completes its hardware initialization tasks. Since the hardware components are known beforehand in this implementation, initialization code in the BIOS is modified to store preset values in hardware registers rather than going through an algorithmic hardware detection and initialization procedure in order to further decrease the startup time. After completion of the state restoration procedure, a jump is made to the operating system return routine 300 in the QNX address space which, as described below, is also the endpoint of the target state image saving routine. The target state image saving routine 100 and operating system return routine 300 are QNX processes located in the address space allocated by QNX. Another QNX process, the target state process 99, is run when it is desired to save a target state image. The target state process moves the system toward a target state, as defined by a configuration file and/or command line parameters, and then calls the image saving routine 100 as an interrupt servicing routine. After the target state image is saved in the image storage medium, the image saving routine jumps to the operating system return routine 300 which then returns to the target process 99 by executing a return from interrupt instruction. Target state process 99 then exits and control is returned to QNX.

The function of the restore routine 200 is to bring the system from a non-operational (e.g., powered down) state to a target state in which the OS is loaded and applications are ready to run. Most of the time during booting of the OS is dedicated to loading the OS files and reading configuration files, and detecting hardware, which involves various timeouts and port scans. Since the hardware in this implementation is fixed, a snapshot can be taken of the system memory, CPU registers and all hardware that has been initialized by the OS at the time snapshot is taken to generate an image of the target state. Bringing the system later to this target state from the image makes the OS believe that it just passed through the complete booting process, because there is no difference between the booted state and restored state with respect to anything accessible to and used by the OS. Additional issues involved are making the OS aware of the time difference between saved image and current time, and possible file system changes.

Saving the image involves accessing the lowest-level system resources, and this has to be done by code operating in the kernel or ring 0 privilege level. This is achieved by attaching the code of the saving routine 200 to an interrupt handler and then generating an interrupt, thus giving control to the saving code which is then guaranteed to run in ring 0. The image saving procedure is initiated by the OS first running the target state process 99 which moves the system toward the target state before the image saving routine 100 is executed. The priority of the target state process 99 is boosted, since there is nothing else that is of higher priority.

Several processes are run after the target state is restored. The real-time clock is synchronized to the hardware clock, the mouse driver is reinitialized, and the windows graphical user interface is restarted. In addition, at least one application should be run as well, since the goal of the implementation is to start a functioning external programmer for a cardiac rhythm management device. Starting an application requires reading the file from hard disk, and this is a slow process. Unix operating systems such as QNX allow an application to be loaded into memory and then held in a suspended state until a signal is received to start the actual execution. This is the approach taken in this implementation where several processes are read from the hard disk before the system's image is saved, thus lessening the time spent in getting the applications to run after image is restored. Depending on the command line parameters that are input when the target state process 99 is executed, one or more programs are read from disk and loaded into memory where they are held in a suspended state. The target state image captured by the image saving process then contains these suspended processes in the process tables of the OS. The process 99 also reads system timer granularity by calling the QNX function qnx_osinfo. The timer granularity value will have to be restored after the target state is restored because the BIOS setting of the timer is not guaranteed to be the same as QNX's.

The file system is then unmounted by the target state process 99, because the application may make changes on the hard drive, and the restored target state will not know about these changes. Unmounting the file system guarantees that all the files are closed during the image saving procedure, and subsequent remounting of the file system during the target state restoration procedure will cause the directory of the hard disk to be reread, thus tracking all the changes that have happened since the time the image was saved. Additionally, the cache buffers will hold file data of the recently opened files. Even though the disk directory will be reread, if the system attempts to open and read the file that has been changed, the OS will provide the data from cache instead of reading it from the hard disk. Therefore, the cache buffers are invalidated.

The target state image saving function 100 is attached to the non-maskable interrupt (NMI) as an interrupt handler. The target state process therefore generates an NMI to pass control to the image saving routine 100. The code is then executing in ring 0, ready to save the system image. The SaveState function 110 is then called which saves all CPU's general use registers and segment registers on the stack, with the data segment registers tracking the target state process's data segment. Then it sets the FS register to point to that data segment, since it is much more convenient to have the data segment register to be 0-based. Segment registers DS and ES are then set with the QNX_FLAT_SEG value, defining a 0-based, 4 GB segment.

The QNX OS uses the paging mechanism of the Pentium processor, which means that physical addresses of memory are not easily calculated. Since it is an image of physical memory that is to be saved, however, extensive use must be made of information contained in the page tables. Since this is a time-consuming process, some preliminary work is done by the SaveInit function 120 to help with the translation. The system information saved in the target state image is kept in a target state data structure, referred to in this implementation as the CSS structure 400. The Pentium control register CR3 holds the physical address of the page directory, and is saved in the CSS. Every translation of address will involve walking through the page directory, and it contains physical addresses of page tables. Since using physical addresses requires another translation, the page directory is scanned and copied to Page_Xdir array 140, filled with translated linear addresses. This way, any time a physical address is needed, a page table can be found by its linear address from the translated page directory. The FixPageTable function 130 walks through the page directory and translates all used entries, stuffing them into Page_Xdir array 140. The linear address of the page directory itself is saved in a variable PageDirAddr 145.

To save time during the restoration procedure and save space in storing the target state image, the image saving routine saves only pages of memory that are present in physical memory, not full of zeroes, and actually used (i.e., page frames). Again, the starting addresses of these pages are found in the page tables, and these addresses are physical, but linear addresses are needed to be able to get to the pages. So, an array of linear addresses is built and filled with starting addresses of every used page. Along with this list, the list of exclusions is built, and this list is a part of the CSS structure. It contains physical address of the last page to be saved before the gap, and then the first page that is used again. The target state restoration procedure will walk through this list, picking up start and stop addresses. The lists are built by the FixPageList function 150, the array of linear addresses is called the PageList array 152, and the array of start/stop addresses is called the BlockList array 154.

If a problem is encountered during creating the list of translated addresses, for example, memory is too fragmented and the list can not fit into the CSS, the BreakFlag variable 156 is set to 1. As soon as SaveInit returns, this flag is checked. If it is set, control returns directly to the image process 99 without going through actual saving of the target state image. After SaveInit returns, control is given to the SetupFsBase function 160. This function calculates the 0-based linear address of the start of the image saving routine's code/data segment. This way, for any calculations that will require identity mapped address (same with and without paging, so that the linear address equals the physical address), the offset within the code or data segment is added to this base. The function takes the value of the code segment register and walks through the GDT (global descriptor table), and possibly the LDT (local descriptor table), to find the descriptor for the code segment, which descriptor contains the segment base.

If the hard disk is used as the image storage medium, a file for storing the image is located on the disk by the FileFound function 170. It uses low-level IDE disk access to read/write, without using interrupts. This code knows how to interpret the partition table, locate FAT16 partitions and find the first cluster of a file called FLASHIMG.DAT in which the target state image will be stored. The ClusterToLBA function 172 calculates the LBA (linear block address) of the first cluster of the file FLASHIMG.DAT, so that the saving functions will know where on the disk to write data.

If a flash ROM is used as the image storage medium, then the page directory has to be patched to make addresses used by flash accessible by the CPU. First, the physical address of flash is acquired from the PCI configuration data, and this address is used in the page directory fields. The linear address available is found by scanning page directory for two consecutive blank entries, to allow 8 MB of flash space. These two entries are patched with the addresses of two page tables, that we create in our own data segment. The starting address of the page tables is aligned on the 4 K boundary, and the resulting linear address is converted to the 0-based linear address by adding the FS base to it, and then finally it is converted to the physical address that can be stuffed into the page directory. Then all the entries in the page tables are filled with physical addresses of flash ROM, and the flash ROM is erased.

Now control is passed to the Write function 180 that will actually save all the system information into the flash ROM or hard disk. The following Pentium registers are saved in the CSS: flags, CS:EIP, SS:ESP, CR0, CR2, CR3, CR4, TR, GDTR, LDTR and IDTR. The interrupt masks are read from the PIC (programmable interrupt controller) and saved in the CSS. The ident command is sent to the hard drive, and the setting for the multiple sector transfers and currently set geometry is extracted from the ident data and saved in the local variables. There is no need to save this data in the CSS structure, since it will not be used by restore process. When restore routine jumps back to the QNX code, this code can easily locate its local variables. The address of the CSS structure is converted into 0-based linear and then physical, and saved inside of CSS. This way the restore routine 200 can actually write data into the CSS so that the final restore phases can use this data. The cache is invalidated and flushed to ensure memory coherency, and the CSS is written to the image storage medium. Now the saving procedure goes into a cycle, where all addresses from 0 to the top of RAM are converted into linear addresses and saved to the image storage medium. However, some pages are not saved. The addresses that marked in the BlockList as not present are not saved, and addresses from A0000 to 100000 are not saved, since they do not contain RAM, but rather system BIOS and ROM extensions. The conversion from physical addresses to linear addresses is done by simply indexing into the PageList array. All saves are done in chunks of 4 K, the size of a page.

When the save process is complete, a jump is made to the operating system return routine, designated as the OS_RET routine 300. This is the same code as the restore process will jump to after restoring the target state image. From this point the code does not really know whether the target state image was just saved or restored. The offset of OS_RET is saved in the CSS from the CS:EIP register value, and the restoring code will pick it up and jump there. OS_RET completes the target state restoration procedure, and in case of a save, it just reloads the values of the registers that are already loaded. One important issue here is to invalidate and flush cache and translation lookaside buffers (TLBs), used as cache in the paging mechanism of the Pentium, since the restore code has just switched on paging, and the TLBs in the CPU are invalid. First, segment registers are restored along with stack pointer. Then IDTR, TR, CR2 and CR4 restored. The target state restoration procedure requires some patching of the page tables, and by that time these patches are no longer needed, so the page tables are restored from the values saved in the CSS. Then hard drive geometry settings are set according to the values saved in the local variables. The saving and restoring process did not use IDE interrupts and they were disabled on the controller, so at this moment they are re-enabled again. Then PIC is initialized in the same way as QNX does it during its boot. Finally, the masks of the PIC and CPU flags are restored, enabling interrupts to happen.

OS_RET now returns to the caller of the image saving routine, which pops all general usage registers from stack and returns from the NMI originally initiated for the image saving procedure. Now execution is back at the target state process 99 code, the timer is reinitialized with the values acquired during save, and the file system is remounted. Finally, the programs that were loaded into memory in a held state are allowed to run to reinitialize mouse driver, synchronize system timer with hardware clock and restore the windows GUI. If a user application was specified in the command line, it is allowed to start only after windows GUI is completely loaded. If the image saving routine reports to the target state process that more data was saved than the image storage medium allows, then the processes loaded into memory are not continued, but killed instead and the error message is displayed.

The target state restoration procedure starts with the BIOS giving control to the restore routine, located in the BIOS address space. Since the restore routine code will need to use RAM for data buffers and local variables, it relocates itself into the middle of physical RAM, since QNX is known not to use this memory. The code is thus relocated, and the new GDT is set up. It is then loaded into the GDTR, and since this moment the code does not rely on anything else but its own settings. The restore code reserves space for the buffers and stack; the DS, ES and SS are normally code32 based, but will change to 0-based selectors quite often. If hard disk is used as the image storage medium, the data file is located by using the same function as was used during the image saving procedure to find the file's first cluster and convert this value into an LBA. Then the CSS is read into a local buffer, since it is occupies the first 4 K of the file data and contains vital information on how to allocate the rest of data. Then the pages are read one at a time, and the pointer is compared to the start/stop list stored in the CSS. When the stop address encountered, the memory is filled with 0 until the next start address, and the process of reading data from file is resumed. Special caution is taken when addresses are close to the execution address of the restore code by advancing the memory address to skip over the restore code and prevent overwrite. If flash ROM is used, then its address is fetched from the PCI configuration. Page tables are not used at this time, so the linear address is the same as the physical address. The flash ROM is not read in 4 K pages, but rather in chunks depending on the start/stop addresses. Again, the addresses between stop and start are filled with 0, and the memory region around the restore code is preserved.

The jump into the operating system return code is a far jump instruction, at the end of the restore routine's code. The target CS:EIP values in the jump instruction opcode are loaded with values found in the CSS. Since QNX is using paging, and the restore code does not, the instruction that enables paging in CR0 and the following jump instruction must be located in an identity mapped page. For this purpose the page directory is patched to track the restore code's base address in such a way that its linear address will be the same as its physical address. The original value from the page directory is saved in the CSS. Note that this CSS is the restore code's local copy of CSS and not the one that is located in the QNX code's data space. The critical values like this one will be copied there later. The address of the CSS structure is fetched from the local copy and loaded into register EBX. At that moment the total number of bytes restored is loaded into the CSS, as well as the address of patched page directory entry and its original value. Jumping into the QNX code is performed in two steps. First, the paging is switched on, then target LDT and GDT are loaded into the CPU registers, and then the far jump is taken into the QNX code. From there, the execution continues at the address of OS_RET which is the same execution point as at the end of the image saving procedure.

Although the invention has been described in conjunction with the foregoing specific embodiment, many alternatives, variations, and modifications will be apparent to those of ordinary skill in the art. Such alternatives, variations, and modifications are intended to fall within the scope of the following appended claims.

What is claimed is:

1. An external programmer for an implantable medical device, comprising:
   a processor;
   input and display means;
   telemetry circuitry for communicating with an implanted device;
   a nonvolatile memory for containing executable startup code;
   a volatile system memory for containing executable operating system and application code;
   a nonvolatile image storage medium;
   a target state image saving routine for creating an image of a target state which includes those pages in linear address space that are mapped into page frames of physical address space by a paging mechanism in the target state;
   an operating system return routine for returning control of the external programmer to the operating system software after execution of the target state image saving routine; and,
   a restore routine for transitioning the external programmer from a non-operational state to the target state by restoring the contents of volatile memory and processor registers to the target state in accordance with the target state image contained in the image storage medium and executing the operating system return routine.

2. The external programmer of claim 1 wherein the target state image comprises a compressed copy of selected contents of nonvolatile memory in the target state.

3. The external programmer of claim 1 wherein the image storage medium is flash ROM memory.

4. The external programmer of claim 1 wherein the target state image saving routing stores the target state image as a target state data structure and a target state memory image in the image storage medium and further comprising:
   code in the target state image saving routine for storing the target state memory image as those pages in linear address space that are mapped into page frames of physical address space by a paging mechanism in the target state, and further wherein the target state data structure contains information derived from page tables defining the mapping of the page frames in the target state and values of processor registers in the target state; and,
   code in the restore routine for loading processor registers with the values contained in the target state data structure and for storing the memory image in volatile memory in a manner that restores the page frames of the target state in accordance with the information derived from page tables contained in the target state data structure.

5. The external programmer of claim 1 wherein the target state image contained in the image storage medium includes contents of video memory.

6. The external programmer of claim 1 wherein further comprising startup code in the nonvolatile memory that initializes hardware registers with preset values prior to execution of the restore routine.

7. The programmer of claim 1 further comprising a target state process for moving the system to the target state before execution of the target state image saving routine.

8. The external programmer of claim 4 wherein the operating system return routine is contained in the page frames of the target state.

9. The external programmer of claim 1 wherein the operating system return routine is within an interrupt servicing routine of the operating system software.

10. The external programmer of claim 1 wherein the image storage medium is a processor-executable storage medium and the restore routine is contained in the image storage medium.

11. The external programmer of claim 4 wherein the retrieval and storing of the memory image by the restore routine is performed using physical addresses with paging switched off, and further wherein the restore routine switches on paging before transfer to the operating system return routine.

12. The external programmer of claim 4 wherein the restore routine relocates itself during execution to memory locations in volatile memory that unused in the target state.

13. The external programmer of claim 4 wherein the target state image saving routine scans the presently used paging directory and paging tables and generates a copy of the page directory filled with linear addresses of paging tables to enable translation of linear addresses to physical addresses.

14. The external programmer of claim 13 wherein the target state image saving routine further generates a list of physical addresses of page frames stored in volatile memory locations from the contents of page tables.

15. The external programmer of claim 13 wherein the target state image saving routine further generates a list of linear addresses of pages that are mapped to page frames in memory in the target state to enable translation of physical addresses to linear addresses by indexing into the list with a physical address.

16. The external programmer of claim 15 wherein the target state image saving routine uses the list of linear addresses of mapped pages and the list of physical addresses of page frames to store the memory image in the image storage medium.

17. The external programmer of claim 4 wherein the target state data structure includes a list of physical addresses that corresponds to volatile memory locations in which page frames are stored in the target state, the list being employed by the restore routine in storing the memory image retrieved from the storage device into volatile memory at selected locations.

18. The external programmer of claim 4 wherein the restore routine retrieves the target state data structure from a known location in the image storage medium.

19. The external programmer of claim 4 wherein the target state data structure contains the physical address corresponding to the memory location of the target state data structure in the target state, enabling the restore routine to write to the target state data structure.

20. The external programmer of claim 4 wherein the target state data structure contains the physical address of the page directory in the target state, and further comprising code in the restore routine for: (a) patching the page directory so that physical addresses of restore routine instructions are mapped to the same physical addresses, (b) saving information for unpatching the page directory in the target state data structure, and (c) enabling paging before jumping to the operating system return routine.

* * * * *